(12) United States Patent
Yang et al.

(10) Patent No.: US 12,348,114 B2
(45) Date of Patent: Jul. 1, 2025

(54) MOTOR LOCKING MECHANISM INCLUDING MEMORY ALLOY WIRE

(71) Applicant: SZ DJI TECHNOLOGY CO., LTD., Shenzhen (CN)

(72) Inventors: Zhenpo Yang, Shenzhen (CN); Xin Sun, Shenzhen (CN); Ping Wang, Shenzhen (CN); Jianda Qiu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 181 days.

(21) Appl. No.: 18/215,173

(22) Filed: Jun. 28, 2023

(65) Prior Publication Data

US 2023/0344307 A1    Oct. 26, 2023

Related U.S. Application Data

(63) Continuation of application No. PCT/CN2020/141551, filed on Dec. 30, 2020.

(51) Int. Cl.
| | | |
|---|---|---|
| *H02K 7/14* | (2006.01) | |
| *H02K 1/22* | (2006.01) | |
| *B64U 10/14* | (2023.01) | |

(52) U.S. Cl.
CPC .............. *H02K 7/145* (2013.01); *H02K 1/22* (2013.01); *B64U 10/14* (2023.01); *H02K 2201/18* (2013.01); *H02K 2207/00* (2013.01)

(58) Field of Classification Search
CPC ............ H02K 21/24; H02K 7/12; H02K 1/22; H02K 7/102; H02K 7/145; F03G 7/06143; B64C 11/02
See application file for complete search history.

(56) References Cited

U.S. PATENT DOCUMENTS 7,481,054 B2 *  1/2009  Hageman ................ F03G 7/065
                                                    60/527
10,871,009 B2 * 12/2020 Alexander ............ E05C 19/022
(Continued)

FOREIGN PATENT DOCUMENTS

| CN | 103231814 A | 8/2013 |
|---|---|---|
| CN | 205602149 U | 9/2016 |

(Continued)

OTHER PUBLICATIONS

International Search Report and Written Opinion mailed on Sep. 29, 2021, received for PCT Application PCT/CN2020/141551, filed on Dec. 30, 2020, 8 pages.

*Primary Examiner* — Leda T Pham
(74) *Attorney, Agent, or Firm* — ANOVA LAW GROUP, PLLC

(57) ABSTRACT

A locking apparatus comprises a sliding member, and a first memory alloy wire configured to engage the sliding member to exert a first force to move the sliding member in a first sliding direction to a locked position when electrical energy is applied to the first memory alloy wire. The locking apparatus further comprises a second memory alloy wire configured to exert a second force to engage the sliding member to move the sliding member in a second sliding direction to an unlocked position when electrical energy is applied to the second memory alloy wire. The apparatus further comprises a position limiting structure. When the sliding member is moved to the locked position, the position limiting structure holds the sliding member at the locked position. When the sliding member is moved to the unlocked position, the position limiting structure holds the sliding member at the unlocked position.

18 Claims, 11 Drawing Sheets

(56) References Cited

U.S. PATENT DOCUMENTS

2005/0274580 A1  12/2005  Hageman et al.
2011/0227435 A1   9/2011  Maeda

FOREIGN PATENT DOCUMENTS

| CN | 107465800 A | 12/2017 |
| CN | 109916368 A | 6/2019 |
| CN | 110005678 A | 7/2019 |
| CN | 110805359 A | 2/2020 |
| CN | 111089074 A | 5/2020 |
| CN | 111453001 A | 7/2020 |
| CN | 111994243 A | 11/2020 |

* cited by examiner

MOTOR LOCKING MECHANISM INCLUDING MEMORY ALLOY WIRE

CROSS-REFERENCE TO RELATED APPLICATION

The present application is a continuation of International Application No. PCT/CN2020/141551, filed Dec. 30, 2020, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a locking mechanism including memory alloy wire, and more particularly, to motor locking apparatus and systems including memory alloy wire.

BACKGROUND

Size can be an important aspect of a mechanical apparatus, a motor, a medical device, or other apparatus, devices, and systems. The smaller the apparatus, the more convenience the user will experience, the less external limitation may be involved, and the more functions the apparatus may perform. However, small apparatus may present challenges as well. While less space and energy storage are needed, the complexity of tasks and delicacy of apparatus components may be increased.

Locking mechanisms have traditionally been controlled manually. However, as apparatus or components of apparatus become smaller than a convenient size, handling a locking mechanism with human hands or fingers can be difficult. Electrically controlled locking mechanism is a better choice. Moreover, electrically controlled locking mechanism may reduce the amount and complexity of orders for users to make. Locking and unlocking commands may even be automatically given and assured upon other conditions and information.

Shaking, displacement, and other unintended or inadvertent input present another challenge for small apparatus and the many delicate components of the small apparatus.

Therefore, there exists a need for improved locking mechanisms.

SUMMARY

Consistent with embodiments of the present disclosure, a locking apparatus comprises a sliding member or structure, and a first memory alloy wire configured to engage the sliding member to exert a first force to move the sliding member in a first sliding direction to a locked position when electrical energy is applied to the first memory alloy wire, where the applied electrical energy causes the first memory alloy wire to change length, the change in length exerting the first force to cause movement of the sliding member through the engagement of the first memory alloy wire with the sliding member. The locking apparatus further comprises a second memory alloy wire configured to engage the sliding member to exert a first force to move the sliding member in a second sliding direction to an unlocked position when electrical energy is applied to the second memory alloy wire, where the applied electrical energy causes the second memory alloy wire to change length, the change in length exerting the second force to cause movement of the sliding member through the engagement of the second memory alloy wire with the sliding member. The apparatus further comprises a position limiting structure. When the sliding member is moved to the locked position, the position limiting structure holds the sliding member at the locked position. When the sliding member is moved to the unlocked position, the position limiting structure holds the sliding member at the unlocked position.

Consistent with some other embodiments of the present disclosure, a motor locking system for locking and unlocking a motor comprises a motor, a sliding member, and a first memory alloy wire configured to engage the sliding member to exert a first force to move the sliding member in a first sliding direction to a locked position when electrical energy is applied to the first memory alloy wire, where the applied electrical energy causes the first memory alloy wire to change length, the change in length exerting the first force to cause movement of the sliding member through the engagement of the first memory alloy wire with the sliding member. The motor locking system further comprises a second memory alloy wire configured to engage the sliding member to exert a second force to move the sliding member in a second sliding direction to an unlocked position when electrical energy is applied to the second memory alloy wire, where the applied electrical energy causes the second memory alloy wire to change length, the change in length exerting the second force to cause movement of the sliding member through the engagement of the second memory alloy wire with the sliding member.

It is to be understood that both the foregoing general description and the following detailed description are exemplary and explanatory only and are not restrictive of the invention, as claimed.

DETAILED DESCRIPTION

Figure 1:
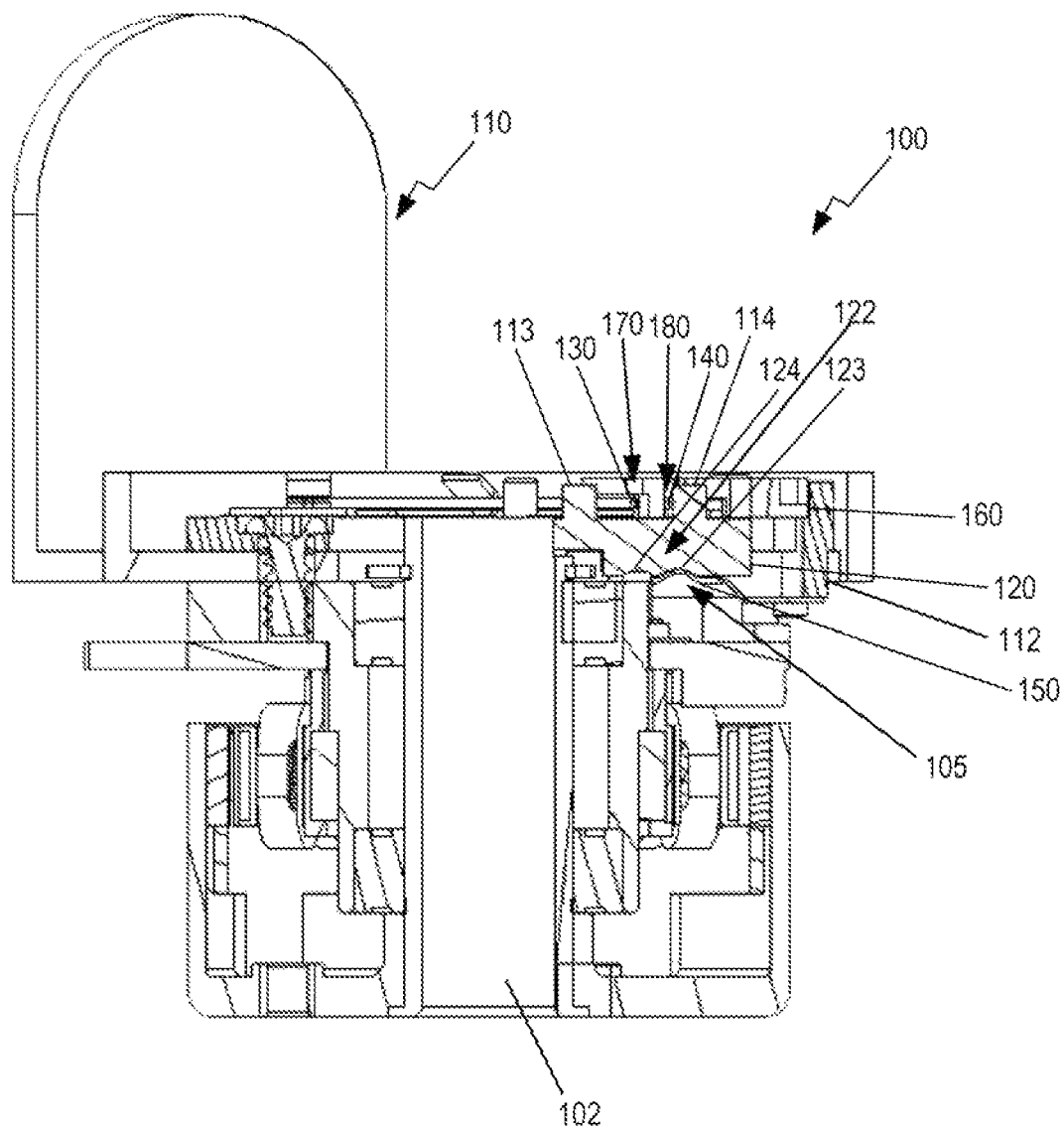
FIG. 1 shows a side view of a first exemplary locking system in accordance with embodiments of the present disclosure.

The following detailed description refers to the accompanying drawings. Wherever possible, the same reference numbers refer to the same or similar parts. While several illustrative embodiments are described herein, modifications, adaptations and other implementations are possible. For example, substitutions, additions or modifications may be made to the components illustrated in the drawings. Accordingly, the following detailed description is not limited to the disclosed embodiments and examples. Instead, the proper scope is defined by the appended claims.

Consistent with embodiments of the present disclosure, there are provided locking apparatus and systems including memory alloy wire.

FIG. 1 shows a side view of a first exemplary locking system 100 configured for locking and unlocking a motor 102, in accordance with embodiments of the present disclosure. Motor 102 may be a linear motor or a rotary motor. In FIG. 1, a body 110 is provided as a diagrammatical representation of the relationship of motor 102 with its parent apparatus, e.g., a vehicle or corresponding operating environment with which motor 102 is associated. For example, motor 102 may be a motor of a rotary joint associated with a gimbal and body 110 may be a portion of the gimbal. As another example, motor 102 may be a rotor of a rotor-propeller assembly associated with an aerial vehicle and body 110 may be an arm of the aerial vehicle on which the rotor is mounted. As a further example, motor 102 may be a linear vibrator of a cellphone and body 110 may be a portion of a shell of the cellphone. Motor 102 may rotate or translate relative to body 110 and the locking system is configured to prevent motor 102 from such rotational or translational movement.

A base 112 may serve as a platform on which various parts related to the locking mechanism of locking system 100 may be disposed and fixed. In some embodiments, base 112 may be disposed on body 110 and may be detachably fixed to body 110. In some other embodiments, base 112 may be a part of body 110 and may not be detachable from body 110. In FIG. 1, base 112 is provided as a diagrammatical representation of its relationship with the locking mechanism in the locking system 100. The structure of base 112 may depend on various factors such as convenience and quality control of fabrication, costs, size, and mechanical and spatial requirements based on the particular application of the locking mechanism. For example, base 112 may have a simple shape and be a part of body 110. As another example, base 112 may have an irregular shape and comprise multiple subcomponents. In exemplary locking system 100, base 112 has a round disk shape with a slight radial expansion on one side for placing a sliding member 120, as shown with more detail in a top view of locking system 100 in FIG. 2. Base 112 has a predetermined depth, as shown in the side view of locking system 100 in FIG. 1.

A sliding member 120 is configured to be movable along a surface of base 112, e.g., in a track along a surface of base 112. At one or more positions along a range of movement of sliding member 120, motor 102 may be locked against movement, e.g., against rotation. At one or more positions along the range of movement of sliding member 120, motor 102 may be unlocked. In some embodiments, the one or more positions may be one or more ranges rather than only one or more discrete positions. In the exemplary embodiments, sliding member 120 is configured to move between a locked position and an unlocked position.

Sliding member 120 is movable by one or more components of locking system 100. Locking system 100 comprises one or more restoring members to exert forces to move sliding member 120. For example, locking system 100 comprises a first restoring member 170 configured to exert a first force to move sliding member 120. Locking system 100 further comprises a second restoring member 180 configured to exert a second force to move sliding member 120. Restoring member 170 is configured to exert the first force to move sliding member 120 to a first position, e.g., the locked position. Restoring member 180 is configured to exert the second force to move sliding member 120 to a second position, e.g., the unlocked position.

Restoring member 170 includes a memory alloy wire, an elastic member such as a spring, or any suitable device, or a combination thereof. In the exemplary embodiments, restoring member 170 includes a first memory alloy wire 130. Restoring member 180 includes a memory alloy wire, an elastic member such as a spring, or any suitable device, or a combination thereof. In the exemplary embodiments, restoring member 180 includes a second memory alloy wire 140.

In FIG. 1, first memory alloy wire 130 and second memory alloy wire 140 are configured to move sliding member 120. First memory alloy wire 130 and second memory alloy wire 140 each exert the first force and the second force respectively to move sliding member 120 through contact with a portion of sliding member 120. First memory alloy wire 130 and second memory alloy wire 140 may each contact with sliding member 120 through one or more hooks, protrusions, buckles, channels, or any other configuration to enable the driving of sliding member 120. First memory alloy wire 130 and second memory alloy wire 140 may be in contact with sliding member 120 all the time, or may only be in contact when driving sliding member 120.

In some embodiments, sliding member 120 includes a first coupling portion configured to engage first memory alloy wire 130 to move sliding member 120, and a second coupling portion configured to engage second memory alloy wire 130 to move sliding member 120. In the exemplary embodiments, the first coupling portion includes a protrusion 113 configured so that first memory alloy wire 130 can be detachably wrapped around a portion of first protrusion 113 to be capable of pulling sliding member 120 by exerting the first force on first protrusion 113. Similarly, the second coupling portion includes a protrusion 114 configured so that second memory alloy wire 140 can be detachably wrapped around a portion of second protrusion 114 to be capable of pulling sliding member 120 through second protrusion 114. In some other embodiments, at least one of first memory alloy wire 130 and second memory alloy wire 140 may wrap around more than one protrusion on sliding member 120 and move sliding member 120 by exerting the second force on the more than one protrusion. In yet some other embodiments, first protrusion 113 may engage an end of first memory alloy wire 130 and enable first memory alloy wire 130 to move sliding member 120 by pulling in the same direction of a straight line wire contraction and its actuated displacement. The use and allocation of first memory alloy wire 130 and second memory alloy wire 140 with respect to the locking mechanism and other components of locking system 100 are described in greater detail with reference to FIG. 2.

The first coupling portion and the second coupling portion may include any suitable structure (e.g., protrusions, channels, grooves, etc.) to engage restoring member 170 and restoring member 180. For example, the first coupling portion may include a first channel through sliding member 120 to engage first memory alloy wire 130 and the second coupling portion may include a second channel through sliding member 120 to engage second memory alloy wire 140. As another example, when restoring member 180 is an elastic member such as a spring, the second coupling portion may include second protrusion 114, or any structure suitable to connect with the spring restoring member. Similarly, when restoring member 170 is a spring, the first coupling portion may include first protrusion 113, or any structure suitable to connect with the spring restoring member.

In some embodiments, locking system 100 may comprise a path limiting structure or apparatus to limit the movement of sliding member 120. In some exemplary embodiments, the path limiting structure may be a cap 160. Cap 160 may limit the movement of the sliding member between the locked position and the unlocked position along a given movement path. Cap 160 is described in greater detail with reference to FIG. 3.

In the exemplary embodiments, sliding member 120 is configured to move between a locked position and an unlocked position, in which motor 102 is locked against movement and unlocked, respectively. Locking system 100 may comprise a position limiting structure 105, to maintain discrete positions of sliding member 120, to resolve a number of engineering issues. For example, without a position limiting structure, after first memory alloy wire 130 has moved slider block 120 to the locked position, first memory alloy wire 130 may need a continuous electrical energy supply to ensure slider block 120 remains at the locked position, assuming no other position limiting mechanism. This may cause an undesirable increase in the electrical energy usage and adversely affect the life of related components. In addition, first memory alloy wire 130 itself may not be able to maintain slider block 120 accurately and stably at the locked position, especially when a sudden external force is applied. Second memory alloy wire 140 with respect to the unlocked position may have similar concerns.

Position limiting structure 105 may include one or more positioning portions each configured to selectively engage one or more engaging portions of sliding member 120 when sliding member 120 is at different positions. The one or more positioning portions may each comprise a leaf spring, a lever, a plunger ball, a protrusion, or any other suitable structure or mechanism. The engaging portions of sliding member 120 may each comprise a groove, a protrusion, or any other suitable structure or mechanism for the at least one positioning to engage. In some exemplary embodiments as shown in FIG. 1, position limiting structure 105 includes a positioning portion that comprises a leaf spring 150. Leaf spring 150 is configured to engage a first one of the engaging portions of sliding member 120 when sliding member 120 is at the locked position. Leaf spring 150 is configured to engage a second one of the engaging portions of sliding member 120 when sliding member 120 is at the unlocked position. In the exemplary embodiments shown in FIG. 1, the first engaging portion is a groove 123 at the bottom of sliding member 120 and the second engaging portion is a groove 124 also at the bottom of sliding member 120. Groove 123 is on the right and groove 124 is on the left, as viewed in FIG. 1. A fitting portion of leaf spring 150 has any suitable shape to engage with either of groove 123 or groove 124. In the exemplary embodiments, the shape of the fitting portion of leaf spring 150 has a protrusion shape similar to the top side contour of a speed bump. In some other embodiments, the fitting portion of leaf spring 150 may have a different protrusion shape, or other type of shape or structure suitable.

In some other embodiments, sliding member 120 includes at least one or more engaging portions each configured to be selectively engaged by one or more positioning portions of position limiting structure 105 when sliding member 120 is at different positions. For example, sliding member 120 may include an engaging portion and position limiting structure 105 may include a first positioning portion and a second positioning portion. The first positioning portion is configured to engage the engaging portion when sliding member 120 is at the locked position, thereby immobilizing sliding member 120 at the locked position. The second positioning portion is configured to engage the engaging portion when sliding member 120 is at the unlocked position, thereby immobilizing sliding member 120 at the unlocked position.

Groove 123 and groove 124 may have the same shape or different shapes with each other. The shape(s) of groove 123 and groove 124 may be any suitable shape or structure that can fit or receive the corresponding fitting portion of leaf spring 150 and provide enough resistance such that sliding member 120 may not easily move from a current position while still allowing block 120 to be moved out of the current position when sufficient force is applied. In some exemplary embodiments, groove 123 and groove 124 may both have a concave shape closely mirroring the protrusion shape of the corresponding fitting portion of leaf spring 150 so that groove 123 or groove 124 may effectively engage leaf spring 150 to prevent unintended movement of sliding member from the locked or unlocked position. When sliding member 120 is moved to the locked position, the fitting portion of leaf spring 150 of protrusion shape may be received in groove 123, thereby immobilizing sliding member at the locked position. Similarly, when sliding member 120 is moved to the unlocked position, the fitting portion of leaf spring 150 of protrusion shape may be received in groove 124, thereby immobilizing sliding member 120 at the unlocked position.

In some other embodiments, position limiting structure 105 may include a plunger. The plunger may be a spring plunger. The plunger and the use and allocation of the plunger by position limiting structure 105 and locking system 100 are described in greater detail with reference to FIGS. 7 and 8.

In some embodiments, an electrically controlled locking apparatus may comprise one or more components of locking system 100 and may be for use of locking an object other than a motor. For example, when motor 102 is replaced by a door or a portion of a door, locking system 100 may form a door locking apparatus. As another example, locking system 100 and sliding member 120 may be configured to control operation of an electrically controlled valve.

Figure 2:
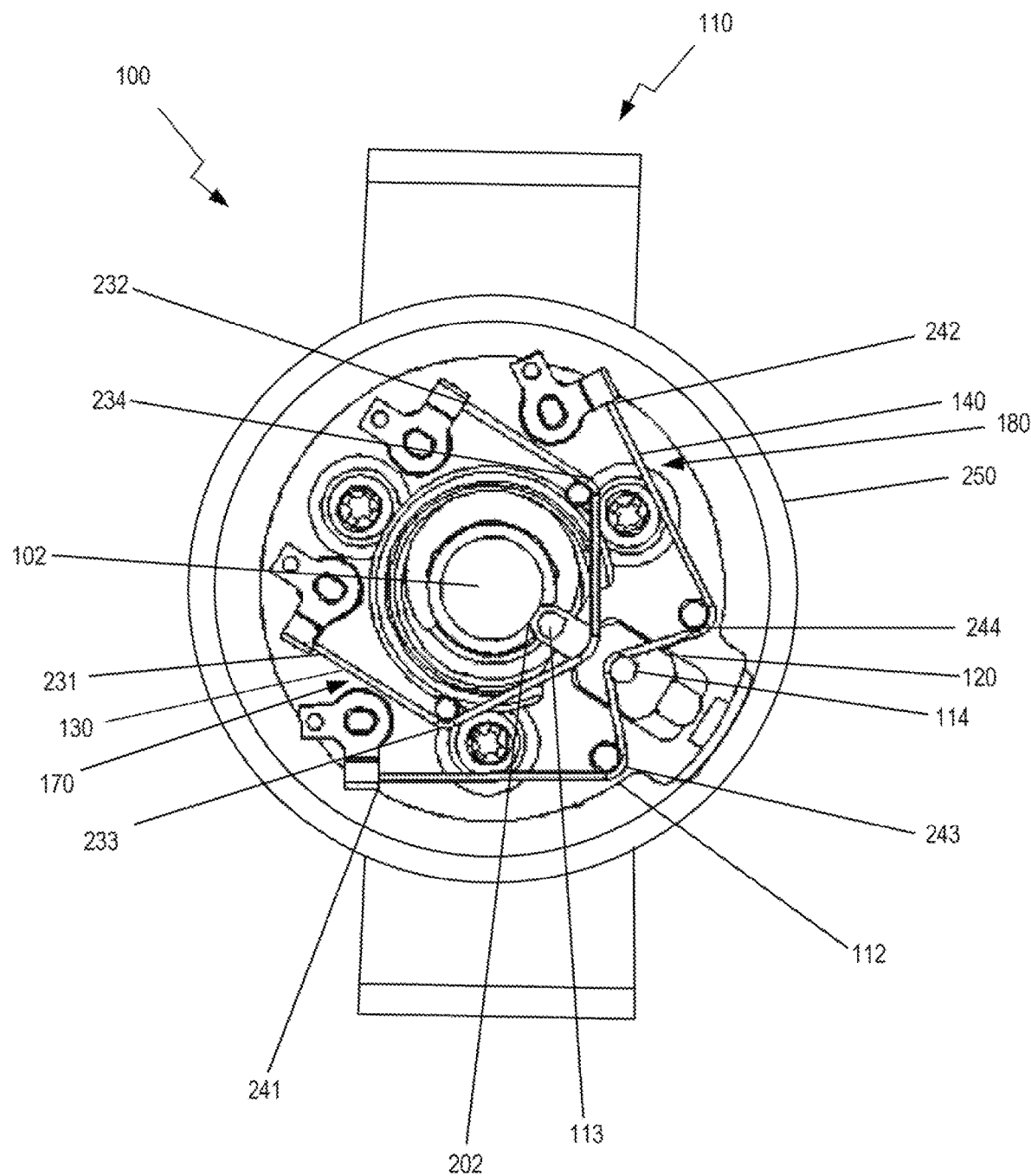
FIG. 2 shows a top view of a portion of the first exemplary locking system in accordance with embodiments of the present disclosure.

FIG. 2 shows a top view of a portion of locking system 100 in accordance with embodiments of the present disclosure. In order to better show certain components and structure of locking system 100 such as the shape of first memory alloy wire 130 and second memory alloy wire 140, cap 160 of locking system 100 is not shown in FIG. 2.

First memory alloy wire 130 and second memory alloy wire 140 are made of Nickel titanium (Nitinol), Nitinol alloys, or other suitable materials, or combinations or alloys thereof. Memory alloy wires facilitate operation of the locking mechanism disclosed herein and locking system 100 by means of their temperature-dependent characteristics of transformation, and more specifically, electrically controllable change in wire shape and length. Such characteristics enable electrically controlled displacement and actuation of sliding member 120 based on the control of electrical energy supply to first memory alloy wire 120 or second memory alloy wire 130. In the exemplary embodiments, first memory alloy wire 130 and second memory alloy wire 140 shorten (contract) when provided with electrical energy. For example, if first memory alloy wire 130 wraps around a portion of first protrusion of sliding member 120 to be capable of pulling sliding member 120 by exerting the first force on first protrusion 113, first memory alloy wire 130 forms an acute angle θ with the displacement direction and the displacement actuated by first memory alloy wire may be the memory alloy wire contraction multiplied by one or more factors including a cosine θ. As another example, if first memory alloy wire 130 or second memory alloy wire 140 is in a straight line shape and has one end fixed and the other end movable for actuation, the displacement actuated by memory alloy wire contraction when provided with electrical energy would equal to the contraction in length of the straight line memory alloy wire.

Conventionally, memory alloy wires are used in straight line or coil shape. However, straight line shape may not be an efficient use of space in a small apparatus context. Coil shape has other drawbacks such as insufficient driving force. Even if thicker wires may be applied to increase the driving force for coil shape memory alloy wires, this may cause new problem such as a decrease in responsiveness.

Various means optimizing the displacement by memory alloy wires may be applied to locking system 100. Memory alloy wires can form W-shapes, V-shapes, pentagonal arrow shapes, or other suitable shapes to achieve an efficient use of space. This is particularly beneficial for objects and devices that have limited space. For example, as shown in FIG. 2, second memory alloy wire 140 may form an approximate W-shape. Second memory alloy wire 140 has two fixed ends where the ends are fixed to a terminal 241 and a terminal 242. Two fixed ends 241 and 242 terminals are each at an end of the W-shape at the side. Second memory alloy wire 140 has one or more turning points between the two fixed ends to form the W-shape. The one or more turning points include turning points 243 and 244 as two bottom ends of the W-shape and a middle top turning point where second memory alloy wire 140 further engages second protrusion 114 to form the W-shape. Only a middle point of the W-shape at protrusion 114 is movable so that the displacement caused when second memory alloy wire 140 contracts may be transferred to the movable middle point, thereby amplifying displacement with respect to the limited space around movable middle point and the corresponding movement of second protrusion 114. Base 112 may include suitable structures, e.g., protrusions such as pins, for second memory alloy wire 140 to engage at turning points 243 and 244. In some embodiments, base 112 may have additional structure to hold second memory alloy wire 140 to maintain the W-shape stable. For example, base 112 may have a protrusion at turning point 243 and a protrusion at turning point 244, each having a channel configured to guide second memory alloy wire 140 and to allow it to engage, while not fixing any portion of second memory alloy wire 140 at the turning points 243 or 244, so that any contraction of second memory alloy wire 140 may be freely transferred through the turning points and contribute to the displacement at the movable middle point.

As shown in FIG. 2, first memory alloy wire 130 may form part of an approximate pentagonal arrow shape. First memory alloy wire 130 has two fixed ends at terminals 231 and 232 each at an end of the pentagonal arrow, and one or more turning points between the two ends of the pentagonal arrow. The one or more turning points of first memory alloy wire 130 include two turning points 233 and 234 at pentagonal arrow side vertices, and a movable middle point at first protrusion 113 at the pentagonal arrow tip. This configuration amplifies displacement at the movable middle point as contraction on first memory alloy wire 130 is transferred to the movable middle point, within the limited space around the movable middle point and the corresponding movement of first protrusion 113. As shown in FIG. 2, base 112 may include suitable structures, e.g., protrusions such as pins, for first memory alloy wire 130 to engage at turning points 233 and 234. In some embodiments, base 112 may have additional structure to hold first memory alloy wire 130 to maintain the pentagonal arrow shape stable. For example, base 112 may have protrusions at turning points 233 and 234 each having a channel configured to guide first memory alloy wire 130 and to allow it to engage, while not fixing any portion of first memory alloy wire 130 at the turning points 233 or 234, so that any contraction of first memory alloy wire 130 may be freely transferred through the turning points and contribute to the displacement at the movable middle point.

In some embodiments, first memory alloy wire 130 and second memory alloy wire 140 have their ends fixed to base 112 or structures on base 112. In some other embodiments, first memory alloy wire 130 and second memory alloy wire 140 may extend beyond or beneath base 112, such as through holes in base 112, before being fixed at the respective end(s). This may provide additional length for the memory alloy wires and therefore additional potential displacements, but may be at the cost of increased complexity in fabrication.

In some embodiments, first memory alloy wire 130 and second memory alloy wire 140 may have their ends each fixed to a connecting structure on base 112, illustrated as terminals 231, 232, 241, and 242. Fixing to the connecting structure may be in any suitable manner, for example via welding, snap-fit, friction-fit, buckle, bayonet, latch, lock, or otherwise connection, or a combination thereof.

In some embodiments, the connecting structure on base 112 may comprise connection with an electrical energy supply for first memory alloy wire 130 and second memory alloy wire 140. For example, one or more circuits may be connected to some or all of the connecting structures on base 112 at or around the wire ends at terminals 231, 232, 241, and 242, to enable provision of electrical energy to first memory alloy wire 130 and second memory alloy wire 140.

As shown in FIG. 2, motor 102 may have at least one structure for sliding member 120 to engage locking motor 102. Such structure of motor 102 and the corresponding interface portion of sliding member 120 may be grooves, protrusions, or openings, or any otherwise suitable structures on an outer surface of motor 102 and sliding member 120. In the exemplary embodiments, motor 102 may have one motor groove 202 for sliding member 120 to engage to lock motor 102. In some other embodiments, motor 102 may have more than one such structure for sliding member 120 to engage.

When sliding member 102 is in the locked position, a portion of sliding member 120 engages, i.e., fits into motor groove 202, thereby preventing motor 102 from rotating. When sliding member 102 is in the unlocked position, sliding member 120 is disengaged from motor groove 202.

In some embodiments, sliding member 120 fits into motor groove 202 via a sloped surface. The sloped surface may protect sliding member 120 from being broken by allowing sliding member 120 to move away from motor groove 202 when a sudden force is applied causing displacement between sliding bock 120 and motor 102. Protective designs such as the sloped design for motor groove 202 in the exemplary embodiments are not essential to the functioning of the locking mechanism, but rather just to provide an engineering aspect to protect components of locking system 100 under rare and/or adverse situations. Forces, including friction, among motor groove 202, sliding member 120, and position limiting structure 105 contribute to maintaining motor 102 in a locked state and may be configured differently and adjusted to be proportional to the need of locking. For example, locking system 100 may function as a brake for stopping rotors actuating propellers, while the sloped design of motor groove 202, or other protective design, may still be present to allow sliding member 120 to disengage when the motor rotor is moved to rotate at high speed or when certain components receive a sudden impact.

In some embodiments, sliding member 120 may fit closely with the corresponding structure on motor 102 for locking. For example, with reference to FIG. 2, motor groove 202 may closely receive the corresponding portion of sliding member 120 fitting into motor groove 202 so that motor 102 may not rotate through any angle when sliding bock 120 is in the locked position. In some other embodiments, the structure on motor 102 may allow motor 102 to have limited translational and/or rotational displacement relative to sliding member 120 when sliding member 120 is in the locked position. For example, motor groove 202 may be wider than the corresponding portion of sliding member 120 so that motor 102 may rotate through a certain angle when sliding member 120 is in the locked position.

In some embodiments, first memory alloy wire 130 may contract when electrical energy is applied thereto, thereby pulling protrusion 113 in a first direction to the locked position. Second memory alloy wire 140 may contract when electrical energy is applied thereto, thereby pulling protrusion 114 in a second direction to the unlocked position. In some other embodiments, first memory alloy wire 130 or second memory alloy wire 140 may push or otherwise actuate sliding member 120 to the locked or unlocked position. In some further embodiments, electrical energy may be applied to first memory alloy wire 130 until sliding member 120 is moved to the locked position, and electrical energy may be applied to second memory alloy wire 140 until sliding member 120 is moved to the unlocked position.

In some other embodiments, a spring structure pushing or pulling sliding member 120 away from the locked position may be present such that electrical energy may need to be continuously applied to first memory alloy wire 130 to maintain sliding member 120 in the locked position against a force of the spring's structure. Similarly, electrical energy may need to be continuously applied to second memory alloy wire 140.

In some embodiments, motor 102 includes a motor rotor at the center or a central axis of motor 102 and a motor stator located at an outer periphery in the top view of locking system 100 (FIG. 2). The motor rotor is configured to rotate relative to the motor stator when motor 102 is operating. In some embodiments, the first direction may be radially inward towards motor 102 at the central axis of motor 102, and the second direction may be radially outward away from the central axis of motor 102. The first direction may be opposite to the second direction. In some other embodiments, motor 102 may have one or more peripheral parts in a top view of locking system 100 that rotates with the motor rotor at the center axis motor 102, such as a shell 250. The structure on motor 102 for engaging slider block 120 in the locked position may be on shell 250. Slider block 120 may thus move radially outward to a locked position.

In some other embodiments, motor 102 may not be at the center. For example, motor 102 may be at an outer periphery in a top view of locking system 100 while the motor stator is at the center. The first direction to the locked position may thus be radially outward to motor 102 at the outer, while the second direction to the unlocked position may be radially inward. In some other embodiments, the first direction to the locked position may yet be radially inward to the motor stator.

In yet some other embodiments, the first direction and/or the second direction of movement of slider block 120 may not be along radial direction(s). For example, the first direction may have a tangential or axial directional component. In some other embodiments, the displacement at the movable middle point of first memory alloy wire 130 or second memory alloy wire 140 may not be along radial direction(s). For example, a transmission mechanism may be present in locking system 100 so that when the movable middle point of first memory alloy wire 130 moves with a tangential or axial directional component, the transmission mechanism change the direction of output driving force from the movable middle point to be radial and actuates sliding member 120 to move radially to reach a locked position.

In some embodiments, a sensing device may monitor whether locking or unlocking of motor 120 is achieved. The sensing device may be any suitable sensor that can measure whether one or more components of locking system 100 is at a state corresponding to the locked or unlocked position, such as if motor 102 is locked/unlocked or if sliding member 120 is at the locked/unlocked position. For example, the sensing device may be a photoelectric sensor measuring if sliding member 120 is at the locked/unlocked position. As another example, because the resistance of a memory alloy wire changes with the length, the sensing device may be a resistance sensor measuring resistance of first memory alloy wire 130 and/or second memory alloy wire 140 and thereby determining the corresponding displacement of first protrusion 113 and/or second protrusion 114.

Figure 3:
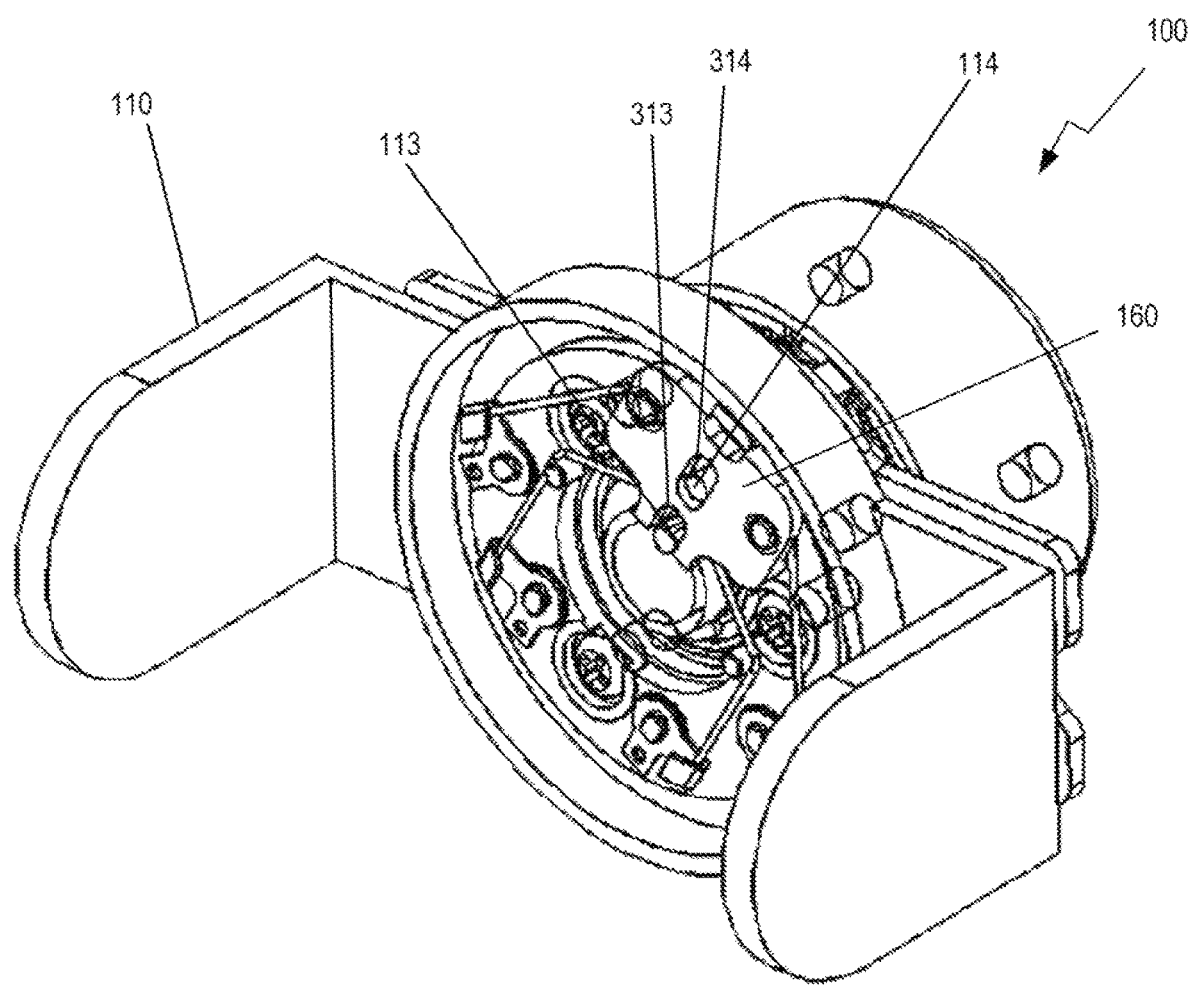
FIG. 3 shows another view of the first exemplary locking system in accordance with embodiments of the present disclosure.

FIG. 3 shows another view of locking system 100 in accordance with embodiments of the present disclosure. As shown in FIG. 3, cap 160 may include a first channel 313 limiting the movement of first protrusion 113, thereby limiting sliding member 120 movement along channel 313. As also shown in FIG. 3, cap 160 may include a second channel 314 limiting the movement of second protrusion 114, thereby limiting sliding member 120 movement along second channel 314. In some embodiments, first channel 313 and second channel 314 may be straight channel. In some further embodiments, first channel 313 and second channel 314 may be along the radial direction so that sliding member 120 may move either towards motor 102 or away from motor 102. First channel 313 may have one end open, given that sliding member 120 is limited position limiting factors such as second channel 314, motor 102, and position limiting structure 105.

In some other embodiments, channel(s) on cap 160 may not be straight or at radial direction. For example, channel(s) on cap 160 may be of sufficient width to allow tangential movement of protrusions of sliding member 120 at a certain radial location in order to render different actuations of memory alloy wires and sliding member 120 feasible. In yet some other embodiments, path limiting structure limiting movement of sliding member 120 may be of a different structure and may be at a different location relative to sliding member 120.

Cap 160 may be disposed on or above sliding member 120. Cap 160 may have one end attached to base 112 or body 110 so that users and engineers may open cap 160 to conduct specific operations on components beneath. Cap 160 may be attached to base 112 or body 110 in any suitable manner, for example by welding, or by a snap-fit, friction-fit, screw-fit, buckle, bayonet, latch, lock, or otherwise secure connection. Apart from the path limiting functions as described above, cap 160 may shield components of locking system 100, such as sliding member 120 and some portions of first memory alloy wire 130 and second memory alloy wire 140, from contamination, damage, and inadvertent touch.

Figure 4:
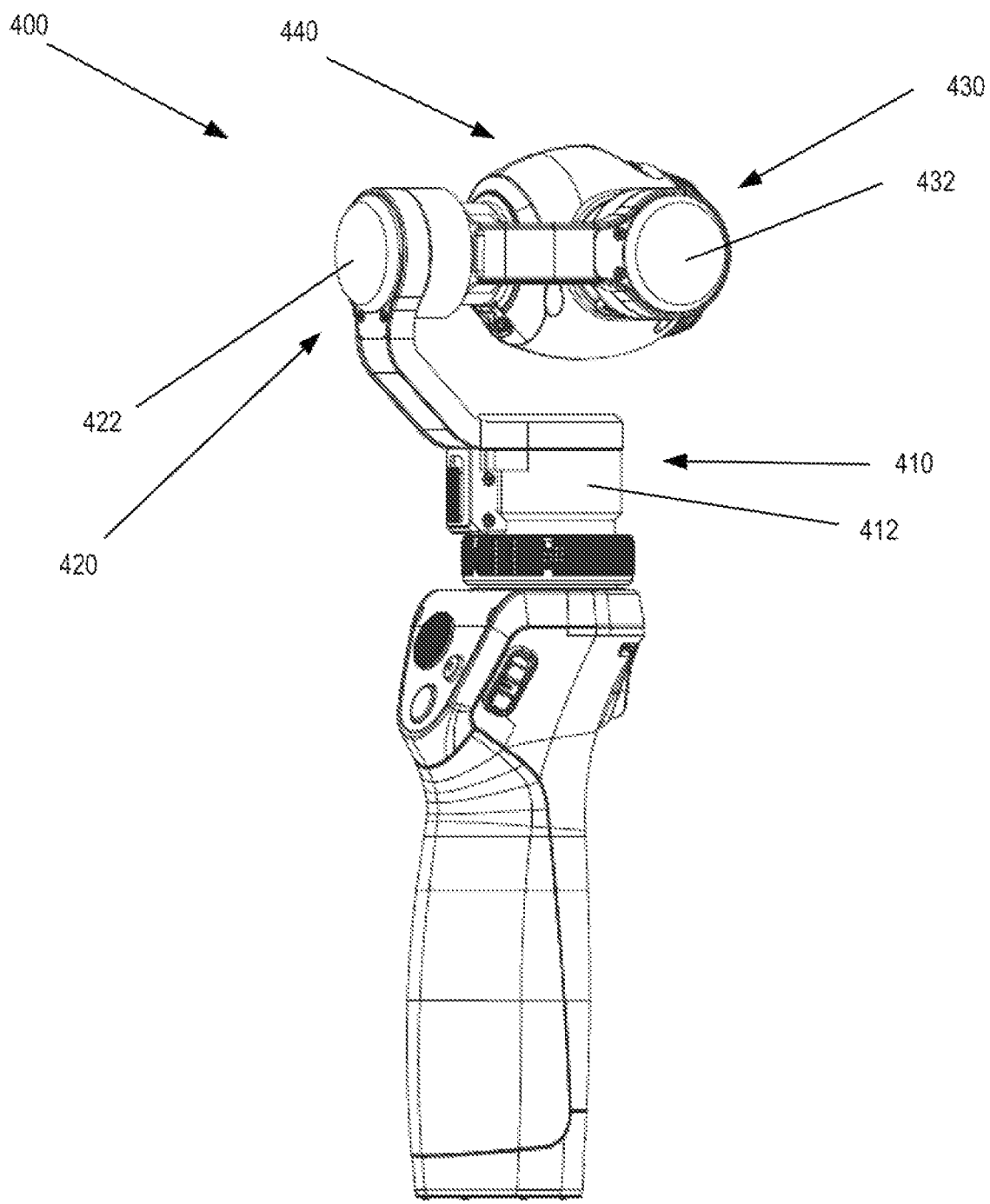
FIG. 4 shows an exemplary application of the first exemplary locking system in accordance with embodiments of the present disclosure.

FIG. 4 shows an exemplary application of locking system 100 in accordance with embodiments of the present disclosure. The exemplary application of locking system 100 may be a stabilization system 400 or a device comprising stabilization system 400. Stabilization system 400 may include one or more devices configured to hold a payload 440 and/or allow payload 440 to be adjusted with respect to up to six degrees of freedom (e.g., three translational directions along its coordinate axes and three rotational directions about its coordinate axes). For example, stabilization system 400 may be a gimbal configured to adjust the attitude of payload 440. Payload 440 may be cargo, optical equipment (e.g., photo cameras, video cameras, etc.), sensory equipment, or other types of payload. Stabilization system 400 may be configured to allow payload 440 to be rotated about one or more of the axes. In some embodiments, stabilization system 400 may be configured to allow 360° of rotation about each axis to allow for greater control of the prospective of payload 440. In other embodiments, stabilization system 400 may limit the range of rotation of payload 440 to less than 360° (e.g., ≤270°, ≤210°, ≤120°, ≤90°, ≤45°, ≤15°, etc.), about one or more of its axes.

Locking system 100 may be applied to at least one of the one or more axes of stabilization system 400. In the exemplary application of locking system 100 shown in FIG. 4, locking system 100 may be applied to one or more of rotary joints of stabilization system 400. In some embodiments, stabilization system 400 comprises a yaw axis locking system 410, a roll axis locking system 420, and a pitch axis locking system 430. Yaw axis locking system 410 includes a motor 412 configured to rotate about a yaw axis of stabilization system 400. In some embodiments, yaw axis locking system 410 is configured to lock a rotation of motor 412 in the same way as locking system 100 described above. Roll axis locking system 420 includes a motor 422 configured to rotate about a roll axis of stabilization system 400. In some embodiments, roll axis locking system 420 is configured to lock a rotation of motor 422 in the same way as locking system 100 described above. Pitch axis locking system 430 includes a motor 432 configured to rotate about a pitch axis of stabilization system 400. In some embodiments, pitch axis locking system 430 is configured to lock a rotation of motor 432 in the same way as locking system 100 described above.

In some other embodiments, some or all of yaw axis locking system 410, roll axis locking system 420, and pitch axis locking system 430 apply a locking system that is similar to locking system 100 but with certain different configurations, such as the exemplary embodiments of locking systems described in detail below with reference to FIGS. 8-10.

In some embodiments, stabilization system 400 may automatically lock some or all of its motors when its motors are powered off. For example, in such embodiments, stabilization system 400 is configured to move a sliding member in yaw axis locking system 410 to a locked position (or keep the sliding member at the locked position) when motor 412 is powered off. This may be achieved by a system control without need of additional user input so that a user of stabilization system 400 does not need to provide an additional user command after turning off the motors of stabilization system 400. This is also helpful in emergency situations in which a user command may not be timely for locking the rotation of rotary joints.

In some embodiments, stabilization system 400 may automatically lock some or all of its motors when its motors are in standby mode. For example, in such embodiments, stabilization system 400 is configured to exert a force to move a sliding member in roll axis locking system 420 to a locked position (or keep the sliding member at the locked position) when motor 422 is in standby mode in which motor 422 is connected to electrical energy and ready to rotate, but does not rotate until receiving a command to rotate. This may be achieved by a system control without need of user input so that a user of stabilization system 400 does not need to remember to provide a user command to secure one or more rotary joints from inadvertent rotating when the motors of stabilization system 400 are in standby mode.

Figure 11:
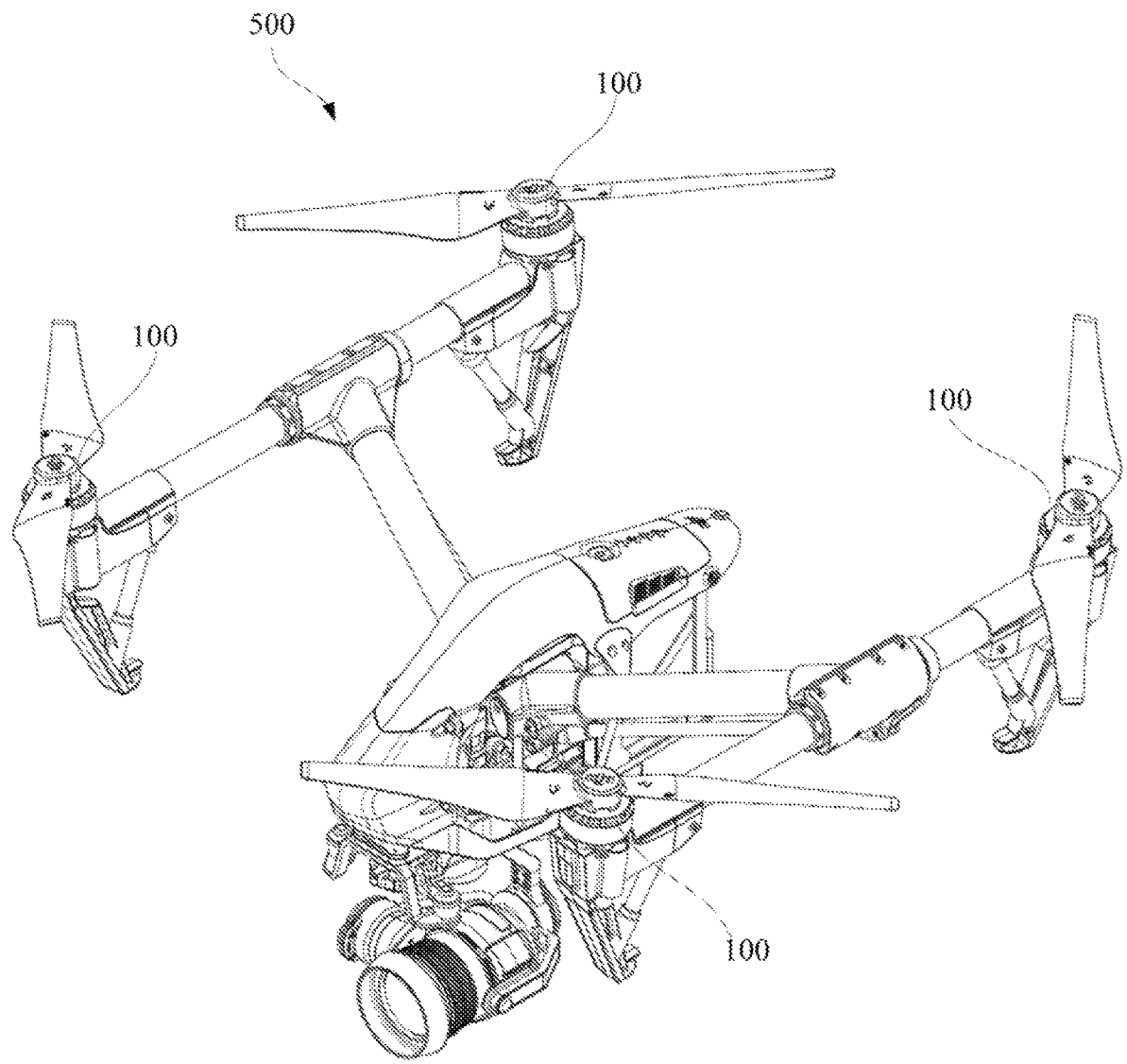
FIG. 11 shows an exemplary application of the fifth exemplary locking system in accordance with embodiments of the present disclosure.

With locking system 100 applied, users do not need to manually find and push any button to mechanically lock the rotary joints. Rather, users may simply click on a remote control to enable locking system 100 to switch between locked and unlocked positions, electrically achieved by actuating sliding member 120 to the locked and unlocked positions. In some embodiments, the switching between locked and unlocked positions may be automatically achieved when stabilization system 400 is conducting other user commands or fulfilling various missions under certain operating modes. For example, when a user turns off stabilization system 400, all rotary joints applying locking system 100 may switch to locked position after a certain predetermined period of time, thereby allowing the user to adjust the arm configuration within the predetermined period of time and preventing rotary motions of the arms that might hit objects in the environment afterwards. As another example, locking system 100 may be applied as a brake for movable devices actuated by one or more rotor-blade assemblies, such as a helicopter or a Multi-rotor unmanned aerial vehicle 500 shown in FIG. 11. Locking system 100 may be applied to lock the one or more rotor-blade assemblies of the movable device, thereby immediately reducing the rotating speed of one or more rotors of the rotor-blade assemblies to zero. This may prevent the rotating rotor-blade assemblies from damaging other objects, such as a parachute released from the movable device in an emergency setting. In some embodiments, locking system 100 may function as a means to reduce the degrees of freedom of stabilization system 400. For example, a user may choose to lock a particular joint between two arms to prevent the two arms from any relative movement (e.g., rotational and/or translational movement).

The two arms may then be considered as one rigid arm and thereby reduce one or more degrees of freedom.

In yet other embodiments, stabilization system 400 may be configured to allow 360° of rotation about an axis when the corresponding locking system is in the unlocked position, but may limit range of rotation of payload 440 to less than 360° when the corresponding locking system is in locked position. For example, as described above with reference to FIG. 2, motor groove 202 may be wider than the corresponding portion of sliding member 120 so that motor 102 may rotate through a certain angle when sliding member 120 is in the locked position.

In some embodiments, locking system 100 may be configured to lock a rotary motor at a specific angle. For example, this may be achieved by having groove 202 at a specific angular location of the rotor of motor 102 such that the motor 102 rotor may be at a specific angle when slider block 120 fits into groove 202 at the locked position.

Figure 5:
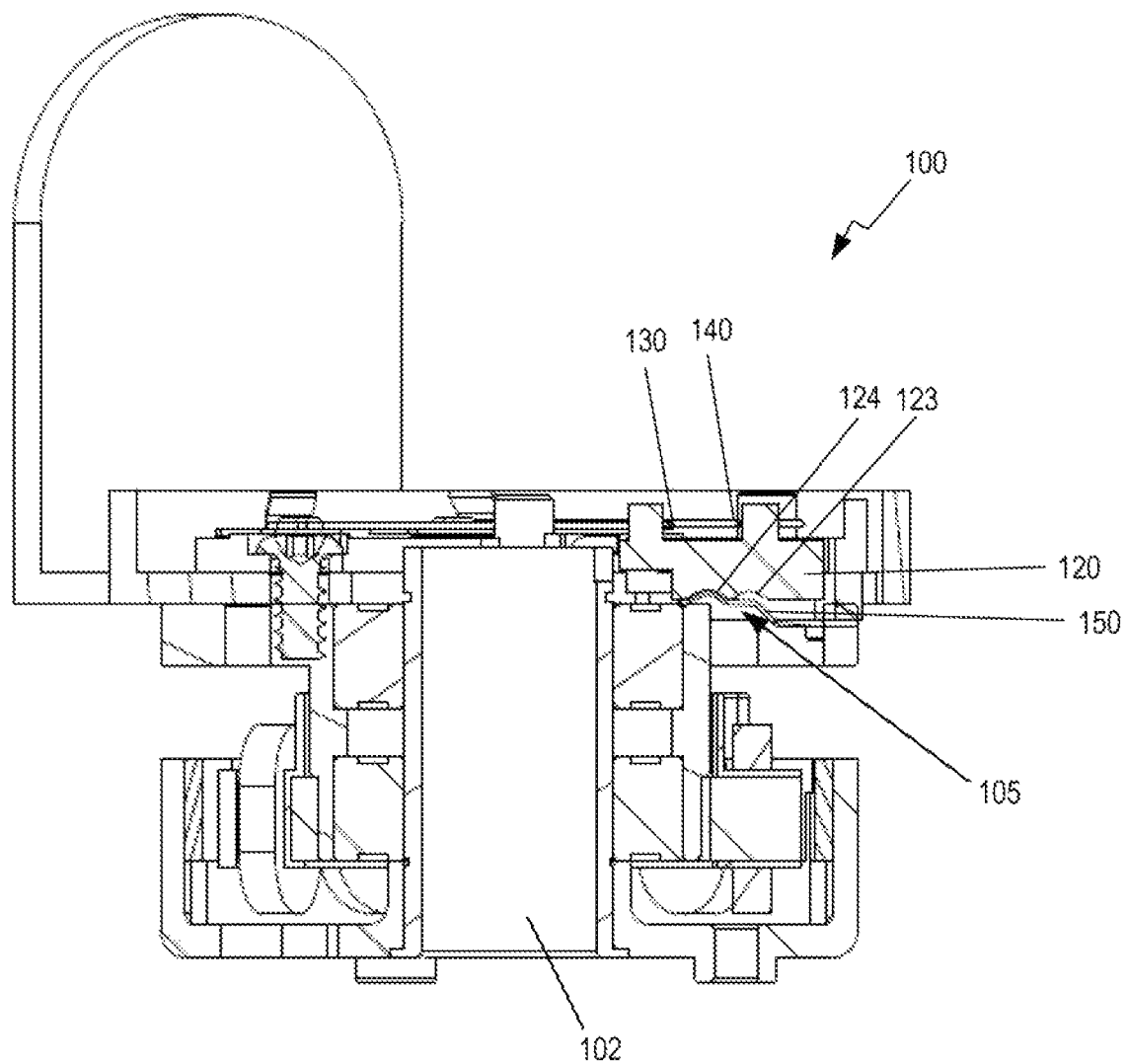
FIG. 5 shows another side view of the first exemplary locking system in accordance with embodiments of the present disclosure.

FIG. 5 shows another side view of locking system 100 in accordance with embodiments of the present disclosure. FIG. 5 is similar to FIG. 1, wherein symbols which are the same as those used in FIG. 1 indicate the same parts of locking system 100. FIG. 5 shows a state of locking system 100 in which sliding member 120 is at the unlocked position and motor 102 is unlocked. This is different from the state of locking system 100 shown in FIG. 1 in that sliding member 120 is at the locked position and motor 102 is locked against movement in FIG. 1.

FIG. 5 illustrates differences between the state of lock system 100 in which sliding member 120 is at the unlocked position and the state of lock system 100 in which sliding member 120 is at the locked position, as shown in FIG. 1. Therefore FIG. 5 does not illustrate every symbol or component already shown in FIG. 1 and not necessary to illustrate the differences.

FIG. 5 also differs from FIG. 1 in that the fitting portion (protrusion) of leaf spring 150 is received in groove 124, thereby immobilizing sliding member at the unlocked position. In FIG. 1, the fitting portion (protrusion) of leaf spring 150 is received in groove 123, thereby immobilizing sliding member at the locked position.

Figure 6:
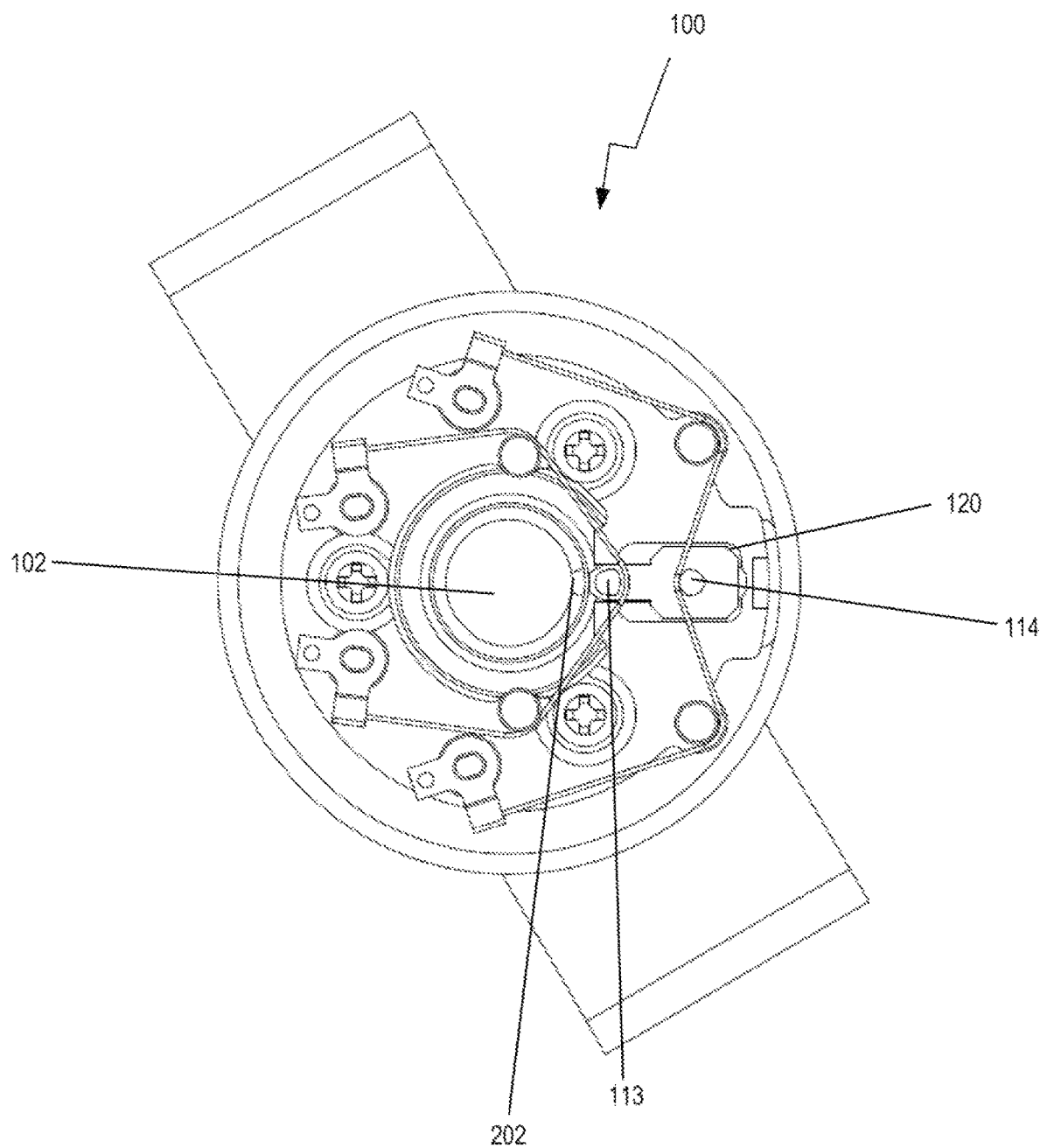
FIG. 6 shows another top view of the first exemplary locking system in accordance with embodiments of the present disclosure.

FIG. 6 shows another top view of locking system 100 in accordance with embodiments of the present disclosure. FIG. 6 is similar to FIG. 2, wherein symbols which are the same as those used in FIG. 2 indicate the same parts of locking system 100. FIG. 6 shows a state of locking system 100 in which sliding member 120 is at the unlocked position and motor 102 is unlocked. This is different from the state of locking system 100 shown in FIG. 2 in that sliding member 120 is at the locked position and motor 102 is locked against movement in FIG. 2.

FIG. 6 illustrates differences between the state of lock system 100 in which sliding member 120 is at the unlocked position and the state of lock system 100 in which sliding member 120 is at the locked position, as shown in FIG. 2. Therefore FIG. 6 does not illustrate every symbol or component already shown in FIG. 2 and not necessary to illustrate the differences.

FIG. 6 is also different from FIG. 2 in that sliding member 120 is positioned away from, i.e., not received by or engaging, groove 202 of motor 102. As shown in FIG. 2, sliding member 120 engages groove 202 to lock motor 102. Groove 202 receives the corresponding portion of sliding member 120 fitting into motor groove 202 so that motor 102 cannot rotate when sliding bock 120 is in the locked position. In contrast as shown in FIG. 6, groove 202 does not receive any portion of sliding member 120 and motor 102 can rotate without any obstruction from sliding member 120.

Figure 7:
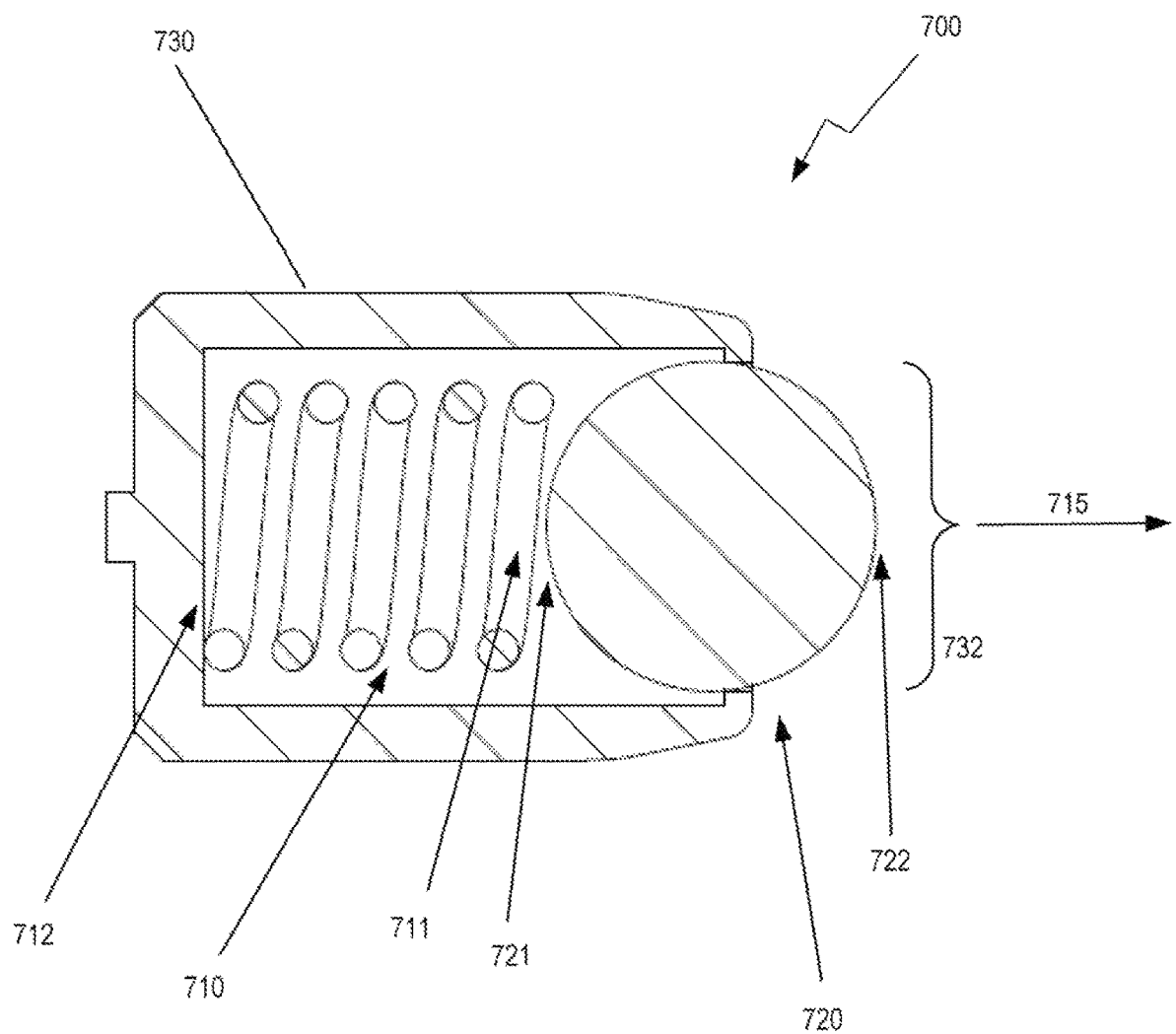
FIG. 7 shows an exemplary plunger in accordance with embodiments of the present disclosure.

FIG. 7 shows an exemplary plunger 700 to be used in exemplary locking system 100 in accordance with embodiments of the present disclosure. In some embodiments, plunger 700 includes a plunger shell 730. Plunger 700 also includes an elastic portion 710 and a positioning portion 720. Elastic portion 710 may comprise a coil spring, a leaf spring, a rubber column, or other suitable device, or a combination thereof. Elastic portion 710 is configured to move positioning portion 720 by an elastic force of the elastic portion. For example, as shown in FIG. 7, elastic portion 710 comprises a spring having a first end 711 in contact with positioning portion 720 and a second end 712 in contact with plunger shell 730. Elastic portion 710 exerts the elastic force in direction 715 and is configured to move positioning portion 720 in direction 715.

Positioning portion 720 is configured to engage a portion or a component of sliding member 120 and provide a position limiting function against sliding member 120. Positioning portion 720 includes a first end 721 in contact with elastic portion 710 and a second end 722 configured to hold sliding member 120. For example, position limiting structure 105 may include plunger 700 instead of spring leaf 150 as shown in FIG. 1 to hold sliding member 120 at the locked position when sliding member 120 is at the locked position. Positioning portion 720 may comprise a positioning protrusion at second end 722 to engage engaging portion 122 of sliding member 120 at groove 124 or groove 123. Because elastic portion 710 exerts the elastic force in direction 715 regardless of the position of sliding member 120, the elastic force moves positioning portion 720 into groove 123 or groove 124 when positioning portion 720 matches groove 123 or groove 124. Therefore, when sliding member 120 is moved to the locked position, positioning portion 720 is moved by elastic portion 710 and the positioning protrusion is received in groove 123, thereby immobilizing sliding member 120 at the locked position. Similarly, when sliding member 120 is moved to the unlocked position, positioning portion 720 is moved by elastic portion 710 and the positioning protrusion is received in groove 124, thereby immobilizing sliding member 120 at the unlocked position.

In some embodiments, positioning portion 720 comprises a plunger ball and sliding member 120 includes an engaging groove corresponding to the plunger ball such that the plunger ball may engage the engaging groove to hold sliding member 120. Shell 730 includes an opening 732 to allow at least a part of positioning portion 720 to be positioned outside shell 730. In some embodiments, positioning portion 720 comprises a plunger ball and the width of opening 732 is smaller than the diameter of the plunger ball so that plunger ball is secured from dropping out of shell 730.

Figure 8:
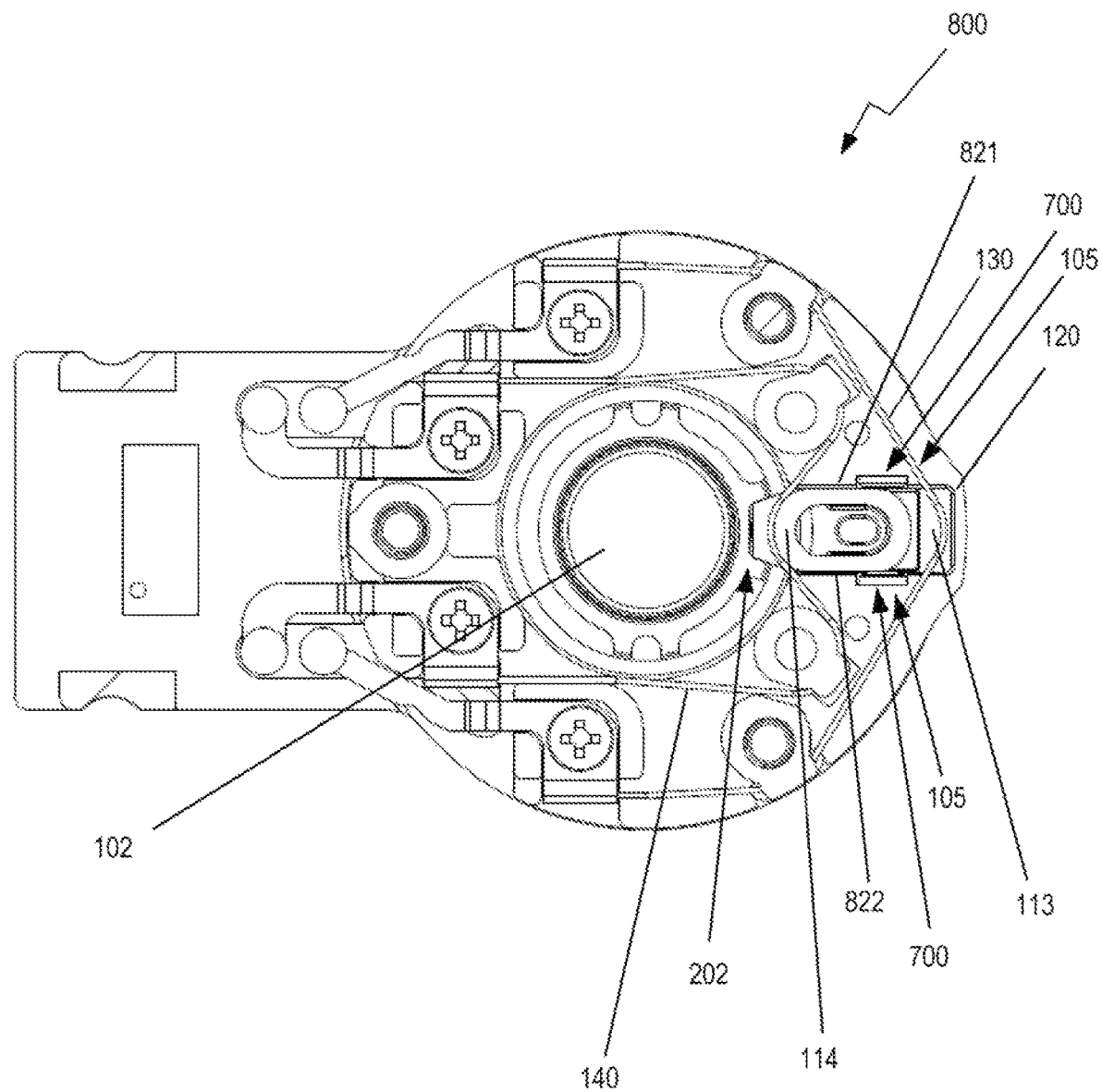
FIG. 8 shows a top view of a second exemplary locking system in accordance with embodiments of the present disclosure.

FIG. 8 shows a top view of a second exemplary locking system 800 in accordance with embodiments of the present disclosure. Locking system 800 is similar to locking system 100 and FIG. 8 is similar to FIG. 2, wherein symbols which are the same as those used in FIGS. 1 and 2 indicate the same parts of locking system 100. As shown in FIG. 8, locking system 800 has a configuration different from the configuration of locking system 100 shown in FIG. 2 primarily regarding position limiting structure 105 and engaging portion(s) at sliding member 120. In FIG. 8, position limiting structure 105 includes at least one positioning portion comprising plunger 700 capable of immobilizing sliding member 120 at the locked and unlocked positions, as compared to leaf spring 150 of the positioning portion in the embodiments shown in FIGS. 1 and 2. Locking system 800 is also different from locking system 100 in that first memory alloy wire 130 is radially positioned further from the central axis of motor 102 than second memory alloy wire 140 in FIG. 8.

FIG. 8 illustrates differences in configuration between locking system 800 and locking system 100. FIG. 8 does not illustrate every symbol or component already shown in FIGS. 1 and 2 and not necessary to illustrate the differences.

As shown in FIG. 8, sliding member 120 includes a side 821 and a side 822. In some embodiments, position limiting structure 105 includes a first positioning portion at side 821 and a second positioning portion at side 822. Sliding member 120 includes a first engaging portion and a second engaging portion at side 821. In some embodiments, position limiting structure 105 includes plunger 700, as described with reference to FIG. 7, at side 821. The first positioning portion comprises a first plunger ball of plunger 700 configured to engage the first engaging portion when sliding member 120 is moved to the locked position, thereby immobilizing sliding member 120 at the locked position. The first plunger ball is further configured to engage the second engaging portion when sliding member 120 is moved to the unlocked position, thereby immobilizing sliding member 120 at the unlocked position. Similarly, sliding member 120 includes a third engaging portion and a fourth engaging portion at side 822. Position limiting structure 105 includes another plunger 700 at side 822 and the second positioning portion comprises a second plunger ball of the another plunger 700 configured to engage the third engaging portion when sliding member 120 is moved to the locked position, thereby immobilizing sliding member 120 at the locked position. The second plunger ball is further configured to engage the fourth engaging portion when sliding member 120 is moved to the unlocked position, thereby immobilizing sliding member 120 at the unlocked position.

In other embodiments, position limiting structure 105 includes only one positioning portion such as the plunger ball of plunger 700 described above. The positioning portion and the corresponding engaging portions at the same side of sliding member 120 are configured in the same way as either of the first positioning portion or the second positioning portion described above.

Figure 9:
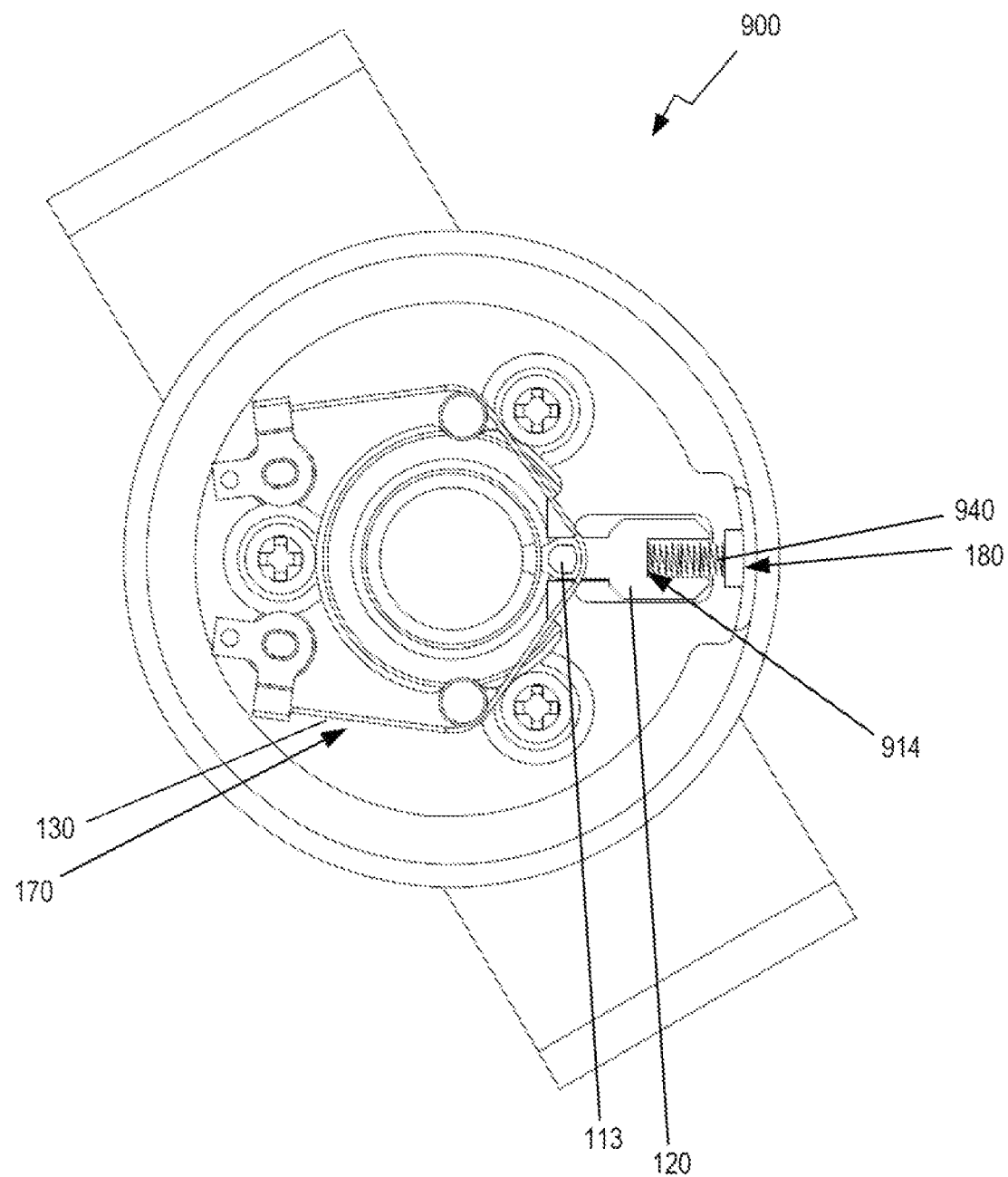
FIG. 9 shows a top view of a third exemplary locking system in accordance with embodiments of the present disclosure.

FIG. 9 shows a top view of a third exemplary locking system 900 in accordance with embodiments of the present disclosure. Locking system 900 is similar to locking system 100 and FIG. 9 is similar to FIG. 2, wherein symbols which are the same as those used in FIGS. 1 and 2 indicate the same parts of locking system 100. For example, restoring member 170 includes first memory alloy wire 130 configured to exert a first force to move sliding member 120 to the locked position, which is the same for both locking systems 100 and 900.

As shown in FIG. 9, locking system 900 has a configuration different from the configuration of locking system 100 shown in FIG. 2 regarding restoring member 180. In particular, instead of including second memory alloy wire 140 in FIG. 2, restoring member 180 in FIG. 9 includes a spring 940 configured to exert a second force to move sliding member 120 in the second direction to the unlocked position.

Sliding member 120 in locking system 900 is slightly different only due to the different embodiment of restoring member 180 as compared with locking system 100 shown in FIG. 2 in that, protrusion 114 wrapped by second memory alloy wire 140 is not present as in FIG. 2. In the exemplary embodiment shown in FIG. 9, sliding member 120 includes any suitable structure or portion configured to allow restoring member 180 to exert a second force to move sliding member 120, such as a surface 914 in contact with an end of spring 940.

In some embodiments, spring 940 exerts a pulling force on sliding member 120 in the second direction to the unlocked position when sliding member 120 is not in the unlocked position. The pulling force of spring 940 is large enough to overcome any position limiting structure of locking system 900 to move sliding member away from the locked position. Therefore, electrical energy may need to be continuously applied to first memory alloy wire 130 to maintain sliding member 120 in the locked position against the pulling force of spring 940.

FIG. 9 illustrates differences in configuration between locking system 900 and locking system 100. FIG. 9 does not illustrate every symbol or component already shown in FIGS. 1 and 2 and not necessary to illustrate the differences.

Figure 10:
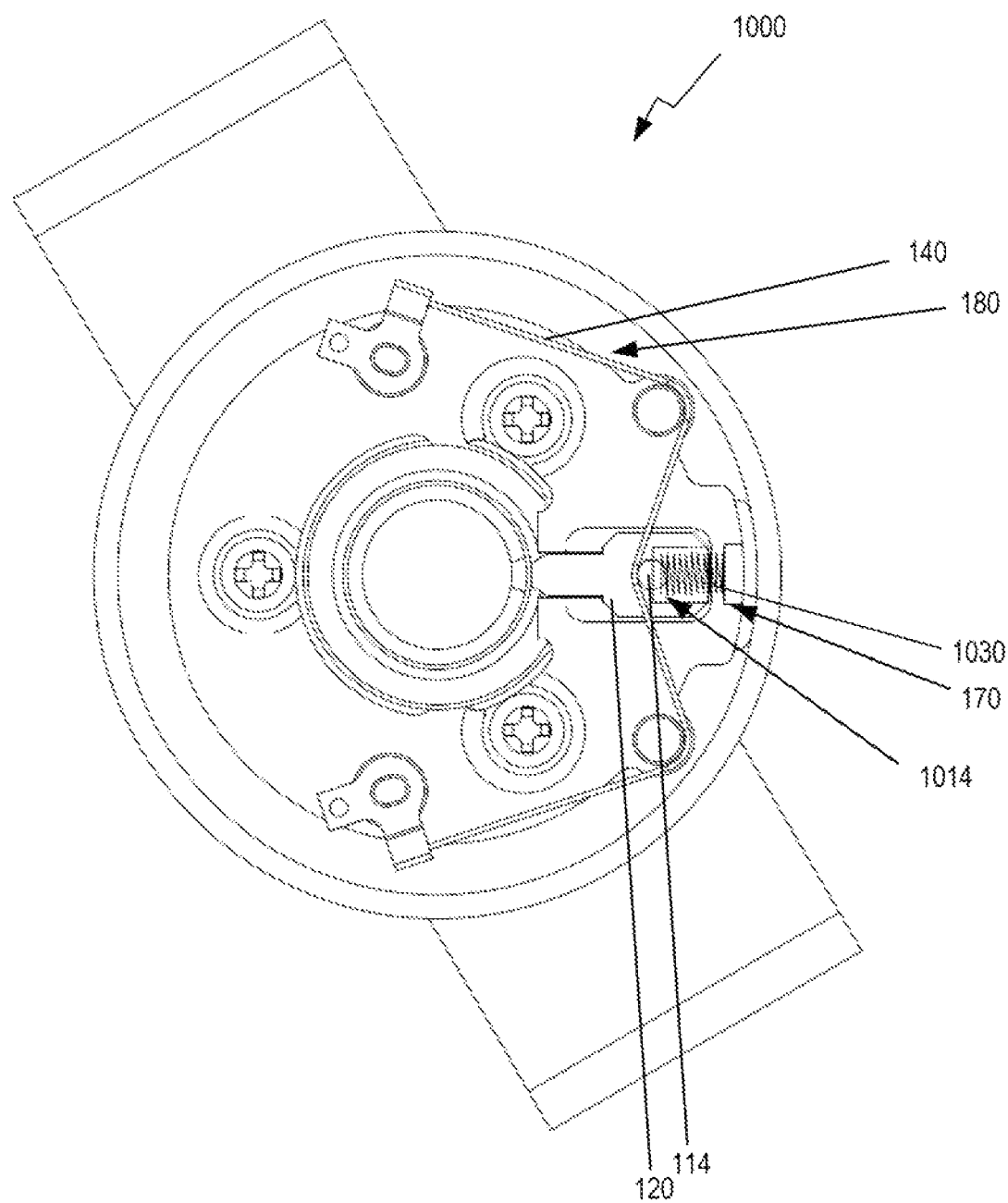
FIG. 10 shows a top view of a fourth exemplary locking system in accordance with embodiments of the present disclosure.

FIG. 10 shows a top view of a fourth exemplary locking system 1000 in accordance with embodiments of the present disclosure. Locking system 1000 is similar to locking system 100 and FIG. 10 is similar to FIG. 2, wherein symbols which are the same as those used in FIGS. 1 and 2 indicate the same parts of locking system 100. For example, restoring member 180 includes second memory alloy wire 140 configured to exert a second force to move sliding member 120 to the unlocked position, which is the same for both locking systems 100 and 1000.

As shown in FIG. 10, locking system 1000 has a configuration different from the configuration of locking system 100 shown in FIG. 2 regarding restoring member 170. In particular, instead of including first memory alloy wire 130 in FIG. 2, restoring member 170 in FIG. 10 includes a spring 1030 configured to exert a first force to move sliding member 120 in the first direction to the locked position.

In some embodiments, spring 1030 exerts a pushing force on sliding member 120 in the first direction to the locked position when sliding member 120 is not in the locked position. The pushing force from spring 1030 is large enough to overcome any position limiting structure of locking system 1000 to move sliding member away from the unlocked position. Therefore, electrical energy may need to be continuously applied to second memory alloy wire 140 to maintain sliding member 120 in the unlocked position against the pushing force from spring 1030.

Sliding member 120 is slightly different in locking system 1000 only due to the different embodiment of restoring member 170 as compared with locking system 100 shown in FIG. 2 in that, protrusion 113 wrapped with first memory alloy wire 130 is not present in the same way as in FIG. 2. In the exemplary embodiment shown in FIG. 10, sliding member 120 includes any suitable structure or portion configured to allow restoring member 170 to exert the first force to move sliding member 120, such as a surface 1014 in connection with an end of spring 1030.

FIG. 10 illustrates differences in configuration between locking system 1000 and locking system 100. FIG. 10 does not illustrate every symbol or component already shown in FIGS. 1 and 2 and not necessary to illustrate the key differences.

It is to be understood that the disclosed embodiments are not necessarily limited in their application to the details of construction and the arrangement of the components set forth in the following description and/or illustrated in the drawings and/or the examples. The disclosed embodiments are capable of variations, or of being practiced or carried out in various ways.

It will be apparent to those skilled in the art that various modifications and variations can be made to the disclosed devices and systems. Other embodiments will be apparent to those skilled in the art from consideration of the specification and practice of the disclosed devices and systems. It is intended that the specification and examples be considered as exemplary only, with a true scope being indicated by the following claims and their equivalents.

What is claimed is:

1. A stabilization system comprising:
   a payload;
   one or more locking systems, each of the one or more locking systems including:
      a motor configured to adjust an attitude of the payload, the motor comprising a stator and a rotor configured to rotate relative to the stator;
      a sliding structure capable of engaging the rotor to lock the rotor;
      a memory alloy wire configured to engage the sliding structure to exert a first force to move the sliding structure in a first sliding direction from a first position to a second position when electrical energy is applied to the memory alloy wire, where the applied electrical energy causes the memory alloy wire to shorten, the shortening exerting the first force to cause movement of the sliding structure through the engagement of the memory alloy wire with the sliding structure; and
      a restoring structure to engage the sliding structure to exert a second force to move the sliding structure in a second sliding direction from the second position to the first position.

2. The stabilization system of claim 1, the memory alloy wire being a first memory alloy wire, wherein:
   the restoring structure includes a second memory alloy wire;
   the second memory alloy wire is configured to engage the sliding member to exert the first force to move the sliding member in the second sliding direction from the second position to the first position when electrical energy is applied to the second memory alloy wire, where the applied electrical energy causes the second memory alloy wire to shorten, the shortening exerting the first force to cause movement of the sliding member through the engagement of the second memory alloy wire with the sliding member.

3. The stabilization system of claim 1, wherein:
   when the motor is powered off, the sliding structure engages the rotor to lock the rotor;
   and/or when the motor is in a standby mode, the sliding structure engages the rotor to lock the rotor.

4. The stabilization system of claim 1, wherein:
   the stabilization system further comprises a yaw axis, a roll axis, and a pitch axis; and
   the motor of one of the one or more locking systems is configured to rotate about one of the yaw axis, the roll axis, or the pitch axis.

5. The stabilization system of claim 2, wherein:
   the stabilization system further comprises a yaw axis, a roll axis, and a pitch axis; and
   the at least one locking system includes:
      a first locking system wherein the motor of the first locking system is configured to rotate about the yaw axis,
      a second locking system wherein the motor of the second locking system is configured to rotate about the roll axis, and
      a third locking system wherein the motor of the third locking system is configured to rotate about the pitch axis.

6. The stabilization system of claim 1, wherein the one or more locking system further comprises a path limiting structure limiting the movement of the sliding structure between the first position and the second position along a path.

7. The stabilization system of claim 6, wherein:
   the path limiting structure further includes a straight line channel in which one of first and second protrusions of the sliding structure is received and is limited to move along the straight line channel;
   the first sliding direction is towards a central axis of the motor; and
   the second sliding direction is away from the central axis of the motor.

8. The stabilization system of claim 1, wherein:
   a rotor of the motor includes a motor groove;
   when the sliding structure is in the first position, a portion of the sliding structure fits into the motor groove, thereby preventing the motor from rotating; and
   when the sliding structure is in the second position, the sliding structure is withdrawn from the motor groove.

9. The stabilization system of claim 8, wherein the portion of the sliding structure engages the motor groove through a slope surface, the slope surface protecting the sliding structure from being broken by allowing the sliding structure to withdraw from the motor groove under a force causing displacement between the sliding structure and the motor.

10. The stabilization system of claim 1, wherein the first memory alloy wire and the second memory alloy wire each has two fixed ends, the fixed ends connectable to an electrical energy supply.

11. The stabilization system of claim 10, wherein:
    the sliding structure includes a first protrusion and a second protrusion;
    the first memory alloy wire exerts the first force to move the sliding structure through contact with the first protrusion of the sliding structure; and
    the second memory alloy wire exerts the second force to move the sliding structure through contact with the second protrusion of the sliding structure.

12. The stabilization system of claim 11, wherein:
    the first memory alloy wire is configured to have a shape of a pentagonal arrow including:
       the contact with the first protrusion of the sliding structure as a tip of the pentagonal arrow; and
       the two fixed ends of the first memory alloy wire each at a rear end of the pentagonal arrow.

13. The stabilization system of claim 12, wherein the first sliding direction extends from the pentagonal arrow tip to the rear of the pentagonal arrow.

14. The stabilization system of claim 11, wherein:
    the second memory alloy wire includes one or more turning points;
    the second memory alloy wire is configured to have a W-shape including:
       the contact with the second protrusion of the sliding structure as a middle of the W-shape;
       two turning points of the one or more turning points as two bottom ends of the W-shape; and
       the two fixed ends of the second memory alloy wire each at a side end of the W-shape.

15. The stabilization system of claim 14, wherein the second sliding direction extends from the middle top to the bottom of the W-shape.

16. The stabilization system of claim 1, wherein:
  each of the first memory alloy wire and the second memory alloy wire shorten when electrical energy is applied thereto;
  the first memory alloy wire is responsive to the application of electrical energy to exert the first force to move the sliding structure to the first position; and
  the second memory alloy wire is responsive to the application of electrical energy to exert the first force to move the sliding structure to the second position.

17. The stabilization system of claim 16, further comprising:
  a position limiting structure, wherein:
    when the sliding structure is moved to the first position, the position limiting structure holds the sliding structure at the first position; and
    when the sliding structure is moved to the second position, the position limiting structure holds the sliding structure at the second position.

18. The stabilization system of claim 17, wherein:
  the sliding structure includes a first groove and a second groove;
  the position limiting structure includes a leaf spring having a protrusion portion;
  the position limiting structure holds the sliding structure at the locked position by the protrusion portion of the leaf spring engaging the first groove when the sliding structure is moved to the first position; and
  the position limiting structure holds the sliding structure at the first position by the protrusion portion of the leaf spring engaging the second groove when the sliding structure is moved to the second position.

* * * * *